(12) United States Patent
Erman et al.

(10) Patent No.: US 9,167,480 B2
(45) Date of Patent: Oct. 20, 2015

(54) METHODS AND SYSTEMS FOR MANAGING DEVICE BANDWIDTH USAGE

(75) Inventors: Jeffrey Erman, Morristown, NJ (US); Subhabrata Sen, North Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 504 days.

(21) Appl. No.: 13/109,266

(22) Filed: May 17, 2011

(65) Prior Publication Data

US 2012/0294160 A1    Nov. 22, 2012

(51) Int. Cl.
    *H04W 24/00*    (2009.01)
    *H04W 28/20*    (2009.01)
    *H04W 8/18*     (2009.01)

(52) U.S. Cl.
    CPC ............... *H04W 28/20* (2013.01); *H04W 8/18* (2013.01)

(58) Field of Classification Search
    CPC . H04L 12/1417; H04L 12/14; H04L 12/1403; H04L 12/5695; H04L 47/10; H04L 47/14
    USPC .................. 370/252; 709/223, 224, 226, 229
    See application file for complete search history.

(56) References Cited

U.S. PATENT DOCUMENTS

| | | | | |
|---|---|---|---|---|
| 2002/0091802 A1* | 7/2002 | Paul et al. | ...... | 709/220 |
| 2006/0233191 A1* | 10/2006 | Pirzada et al. | ...... | 370/463 |
| 2007/0180119 A1* | 8/2007 | Khivesara et al. | ...... | 709/226 |
| 2008/0016197 A1* | 1/2008 | Hardy et al. | ...... | 709/223 |
| 2010/0039937 A1* | 2/2010 | Ramanujan et al. | ...... | 370/232 |
| 2010/0333028 A1* | 12/2010 | Welsh et al. | ...... | 715/833 |
| 2011/0276442 A1* | 11/2011 | Momtahan et al. | ...... | 705/30 |

OTHER PUBLICATIONS

Symantec Technical Enablement Team, "Symantec Endpoint Protection 11.0: Application and Device Control, Version 1.2", published in 2009.*

* cited by examiner

*Primary Examiner* — Khaled Kassim
*Assistant Examiner* — Zhaohui Yang
(74) *Attorney, Agent, or Firm* — Baker & Hostetler LLP

(57) ABSTRACT

Systems and methods for controlling a wireless device by a user based on bandwidth used when the device is connected to a network are disclosed. The bandwidth used by a process when the wireless device is connected to a network is determined. Information associating the value of the bandwidth used by the process when connected to the network, with at least one characteristic of the network is provided. A bandwidth management profile that identifies what process is allowed to be executed on each network is generated. The bandwidth management profile is used to determine whether the process should be executed on the network.

18 Claims, 11 Drawing Sheets

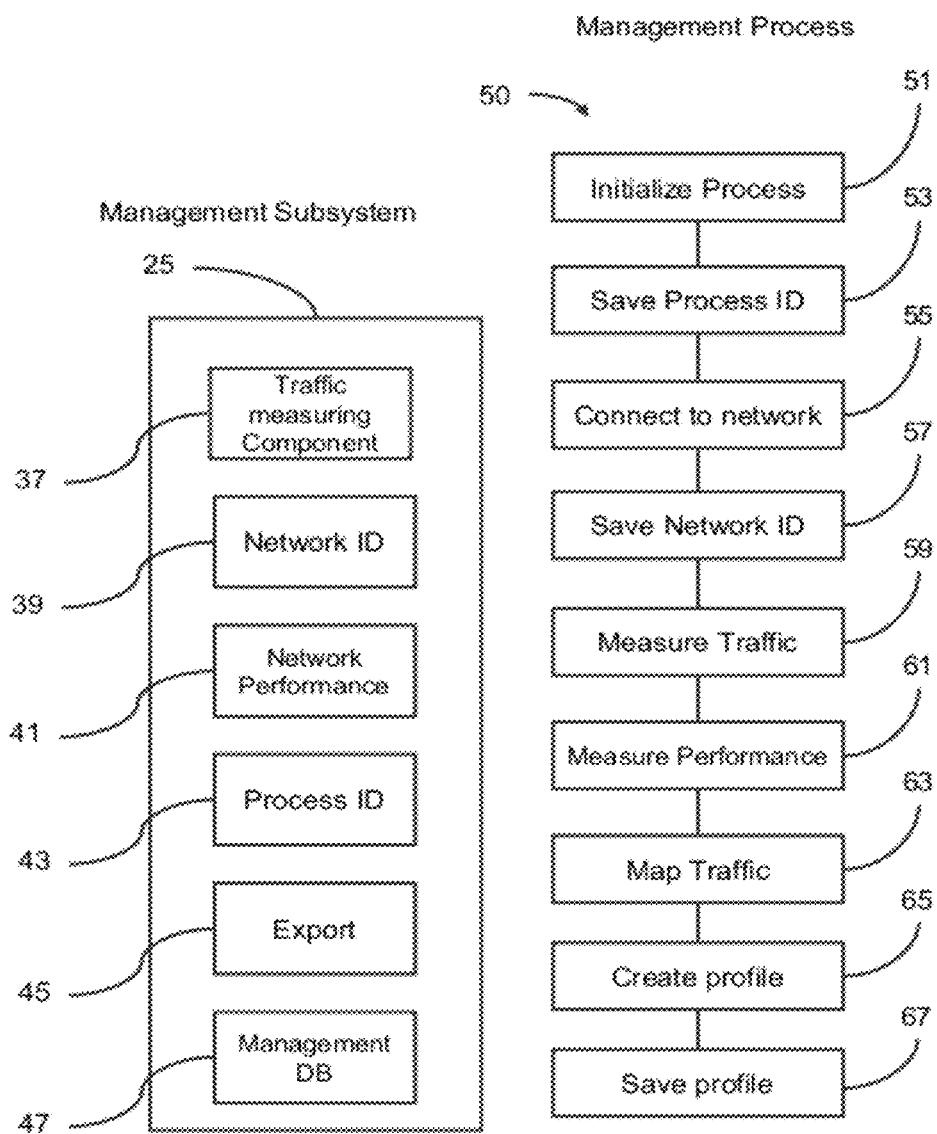

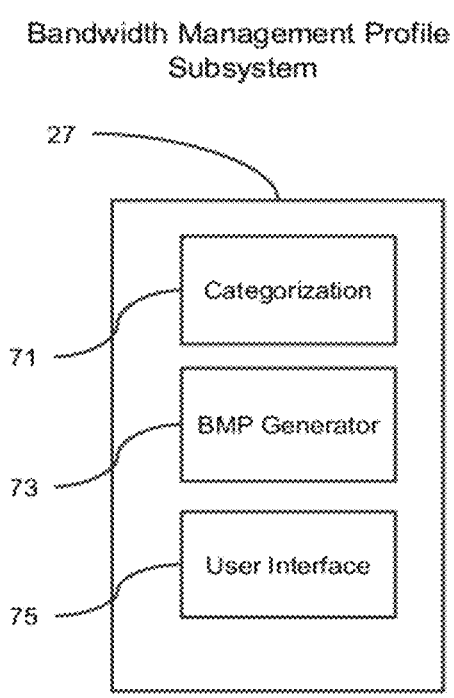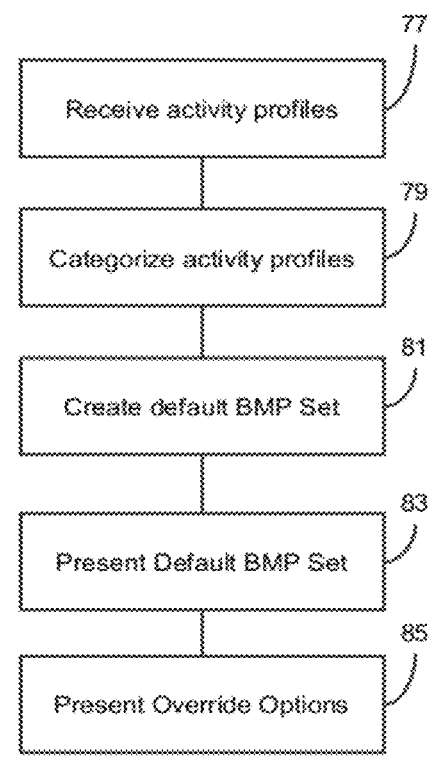
*Figure 5*   *Figure 6*

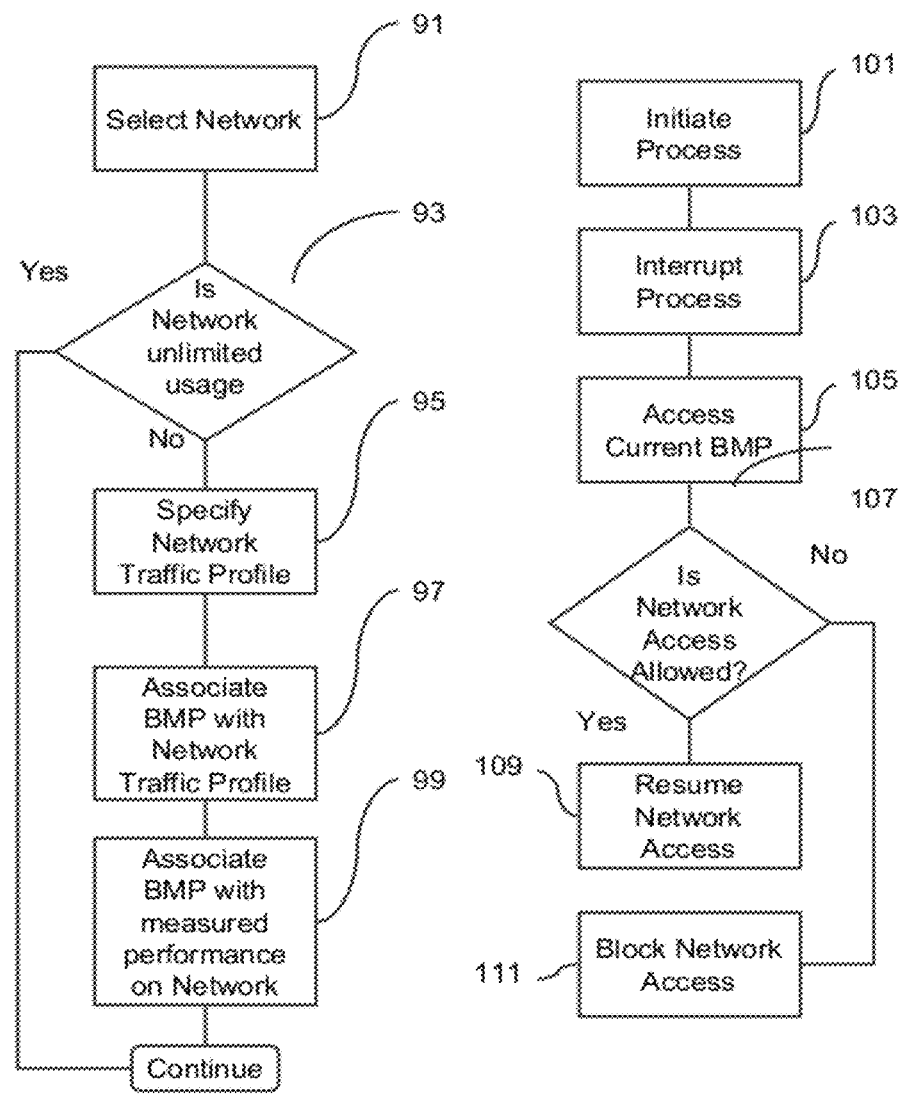
*Figure 7*  *Figure 8*

METHODS AND SYSTEMS FOR MANAGING DEVICE BANDWIDTH USAGE

TECHNICAL FIELD

The present disclosure generally relates to wireless network communication bandwidth management, and more particularly to user management of bandwidth consumed by wireless devices.

BACKGROUND

Users are connecting to networks to access the Internet through a wide variety of connecting devices including smart phones, laptops, notepads and the like. The devices are becoming increasingly sophisticated and are capable of running a variety of applications and downloading files that consume large amounts of bandwidth. Bandwidth is a bit rate measure of available or consumed data communication resources typically expressed in bits/second or multiples of it (kilobits/s, megabits/s etc.). For example an MP3 music file may be approximately 5 MB; games can be as large as 1 GB; and a full length movie may be as large as 2.5 GB and may reach 4 GB to 5 GB if they are high definition (HD). Wireless devices also consume bandwidth when applications and protocols are run in background mode. Examples of such applications include software update checking processes, podcast updates, and participation in peer-to-peer network. In addition, user access to content from the Web may also trigger downloads of online ads that are a further source of bandwidth consumption.

In addition to the variety of wireless devices, users are increasingly able to connect to the Internet through a variety of access networks. These may include Wireless Wide area Networks such as GSM and 3G: Wireless metropolitan area networks such as WiMAX; Wireless local area networks such as WIFI and Wireless personal area networks such as Bluetooth and UWB. These networks may have different pricing and performance. Some networks have a flat rate for unlimited usage. For example, with the introduction of 3G networks in the United States many carriers initially used flat rates for unlimited data as an enticement to users. Some networks impose usage caps of anywhere from 250 MB to 2 GB per month to prevent network overloading. However, with the increasing use of bandwidth consuming applications some carriers have explored moving away from fixed rate unlimited usage pricing towards usage based pricing. For example, operators of 3G networks in the US are assessing usage based pricing. Usage based pricing is not uncommon, and is the default in many parts of the world (e.g. India) for wireline access. Such usage based pricing can have a time component with different peak and off peak models e.g., daytime and night time models.

Existing technologies do not provide users with the capability of effectively managing bandwidth usage depending on the applications used, the type of wireless device, the networks accessed, or the pricing and performance of the networks. There is a need to provide users with the ability to control the execution of applications and processes in wireless devices depending on the bandwidth consumed by the application or process and the cost characteristics of the network used.

SUMMARY

Embodiments of the present invention provide a method of enabling the control of a wireless device by a user based on bandwidth used when the device is connected to a network. The method includes generating information that associates a value of the bandwidth used by a process when connected to a network, with at least one characteristic of the network. The method also includes the step of generating a bandwidth management profile that identifies what process is allowed to be executed on each network. The bandwidth management profile is used to determine whether the process should be executed on the particular network.

Embodiments of the present invention also provide a method of enabling the control of a wireless device by a user when connected to a network based on the bandwidth used by an application or process executed by the device. The bandwidth used by a process is measured when the wireless device is connected to a network. The bandwidth usage measurement is mapped to the process and the information is provided to the user when the wireless device is connected to the network. The information provided is used to control the execution of the process in the wireless device. More particularly, embodiments of the method of the present invention create a set of activity profiles that associate bandwidth consumption with a process and a network. The process executed by the device may be characterized along a plurality of dimensions including bandwidth consumption, initiation mode, running mode, network characteristics and performance of the process when connected to the network.

Embodiments of the present invention provide a system to control a wireless device by a user based on bandwidth used when the device is connected to a network. The system includes a processor and a subsystem that generates information that associates a value of the bandwidth used by a process when connected to a network, with at least one characteristic of the network. The system also includes a subsystem that generates a bandwidth management profile that identifies what process is allowed to be executed on each network. Another subsystem uses the bandwidth management profile to determine whether the process should be executed on the network.

Embodiments of the present invention also provide a system for enabling the control of the wireless device by a user when connected to a network based on the bandwidth used by an application or process. The system includes a processor, a subsystem that measures the bandwidth used by a process when connected to a network. The system also includes a subsystem that maps the bandwidth usage measurements to the process and provides information to the user that allows the user to control the execution of the process based on the information.

Embodiments of the present invention provide computer readable media including instructions that enable the control of a wireless device by a user based on bandwidth used when the device is connected to a network. The instructions include instructions to generate information that associates a value of the bandwidth used by a process when connected to a network, with at least one characteristic of the network. The instructions also include instructions to generate a bandwidth management profile that identifies what process is allowed to be executed on each network. The bandwidth management profile is used to determine whether the process should be executed on the network.

Embodiments of the present invention also provides for computer readable medium storing processor-executable instructions that when executed by a processor, cause the processor to measure the bandwidth used by a process executed by the device. The computer readable medium also includes instructions to map the bandwidth usage measurement to the process responsible for the bandwidth used when connected to the network. Instructions to provide the user with information related to the bandwidth used are also provided, as are instructions to control the execution of the process based on the information.

BRIEF DESCRIPTION OF THE DRAWINGS

The invention will be described and explained with additional specificity and detail through the use of the accompanying drawings in which:

FIG. 3 illustrates an embodiment of a management subsystem;

FIG. 4 illustrates an exemplary process implemented by a management subsystem;

FIG. 5 illustrates an embodiment of a bandwidth management profile subsystem;

FIG. 6 illustrates an exemplary process implemented by a bandwidth management profile subsystem;

FIG. 7 illustrates an exemplary process implemented by a network cost mapping subsystem;

FIG. 8 illustrates an exemplary process implemented by a profile coordination subsystem;

DETAILED DESCRIPTION OF ILLUSTRATIVE EMBODIMENTS

Figure 1:
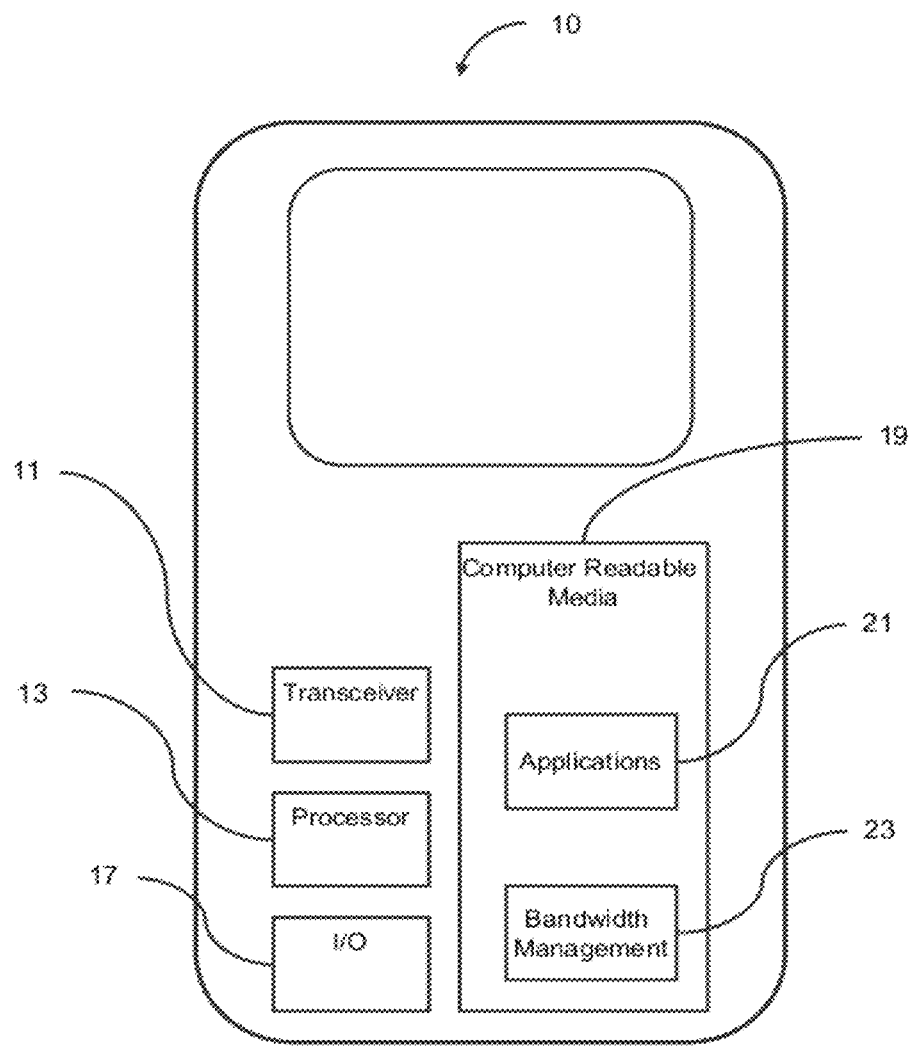
FIG. 1 illustrates an embodiment of a wireless device for managing bandwidth usage.

The present invention features wireless devices (Device (s)) that enable the user to manage the bandwidth consumed by the Device. Referring to FIG. 1, a Device 10 includes a transceiver 11, a processor 13, input output controls 17, and computer readable media 19. The Device 10 may be provided with a plurality of applications 21 and a bandwidth management system 23.

The transceiver 11 communicates with a network such as, for example, a WiFi or 3G network. The processor 13 handles a variety of process functions, including providing control and command signaling with the network, and execution of applications 21 and other processes, as well as the bandwidth management system 23. An application, or program, is a software program that runs on Device 10. For example, e-mail programs, Web browsers, or games are applications. A process is a program or application running on the Device 10. Computer readable media 19 may include tangible computer readable media 13 such as random access memory (RAM), read only memory (ROM), a hard drive, a memory card, or other such storage device. Applications 21 may include an ever increasing number of executable programs including communication applications, such as e-mail; business applications, such as word processing and spreadsheets; games; entertainment such as media players; GPS applications such as navigation systems, and many more. The bandwidth management system 23 may also be implemented in software stored in a separate storage device, or in a separate hardware or firmware component including an external server.

The bandwidth management system 23 enables a user to manage the bandwidth usage of a Device 10 by providing the Device 10 with a set of rules to control what process will be allowed to be executed by the Device 10 when the Device 10 is connected to a network, and controlling the execution of a process on the Device 10 based on the set of rules. The rules are based on a measurement of the bandwidth used by the process when the Device 10 is connected to the network, the costs associated with the bandwidth used in the network and the performance of the network.

Figure 2:
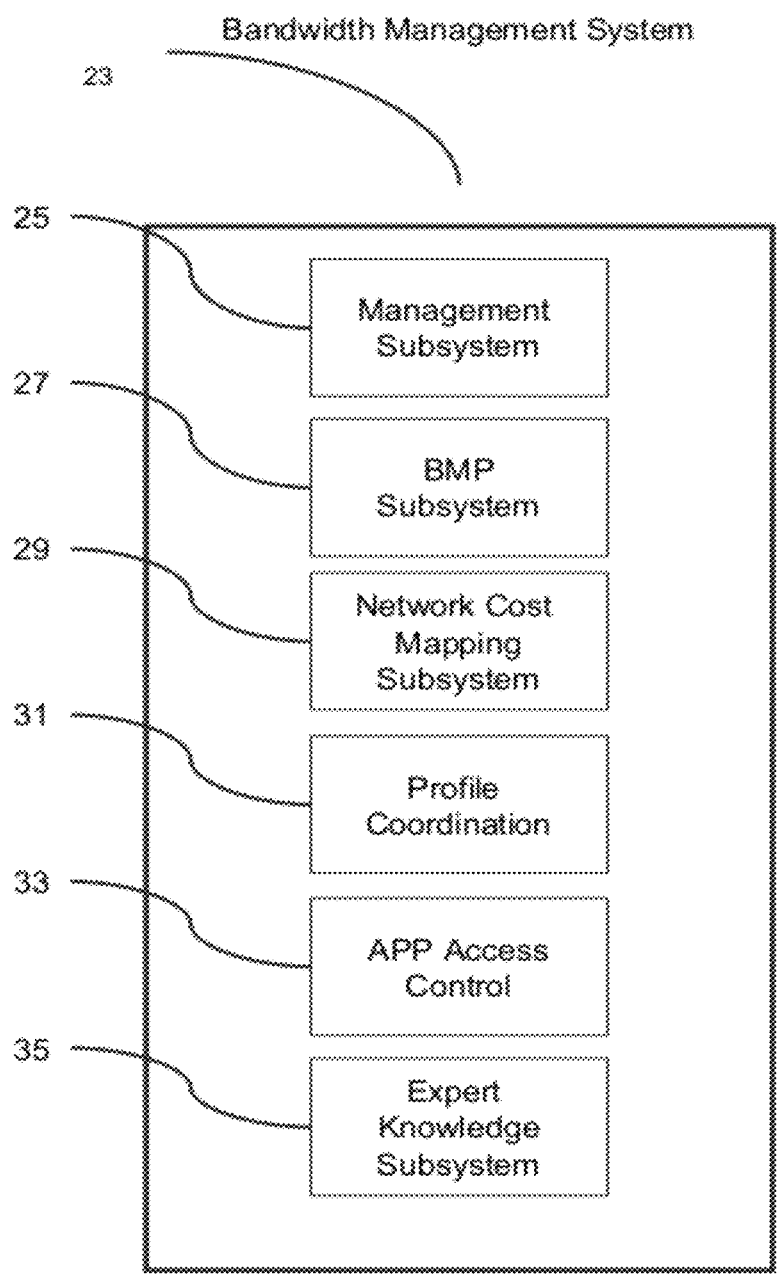
FIG. 2 illustrates an embodiment of a system for managing bandwidth usage in a wireless device.

Illustrated in FIG. 2 are the subsystem components of bandwidth management system 23. The subsystems may include a management subsystem 25; a bandwidth management profile (BMP) subsystem 27; a network cost mapping subsystem 29; a profile coordinator 31; an application access control subsystem 33; and an expert knowledge subsystem 35. Any one or more of the subsystem components may reside outside of Device 10 (e.g. on a server in the network).

Management Subsystem. The management subsystem 25 measures the traffic generated or bandwidth consumed by the user's Device 10, maps the traffic to the applications/processes responsible for the traffic and builds up an activity profile. Optionally, the management subsystem 25 may measure the performance of the network.

Illustrated in FIG. 3 is a representative example of the management subsystem 25 that includes a traffic measuring component 37. An example of a traffic measurement component 37 is a utility that monitors network connections, recording precisely how much data is downloaded and uploaded to the Device 10. The management subsystem 25 may also include a network identification component 39 and an application or process identification component 41. The management subsystem 25 may also include an export component 43 that exports the data collected by the traffic measuring component 37 to a management database component 45 that builds the activity profile. The management subsystem 25 may operate in background mode allowing the user to operate Device 10 in the normal fashion.

Illustrated in FIG. 4 is an example of the management process 50 that may be performed by the management subsystem 25. The user initially runs the management subsystem 25 process. The operation of the management subsystem 25 begins with the initialization of a process or an application as shown in method element 51. The management subsystem 25 saves information that identifies the process in method element 53. When the user connects to the network in method element 55, the management subsystem 25 records information that identifies the network (method element 57). The management subsystem 25 then measures the traffic or bandwidth used or consumed by the process or application in method element 59. Optionally, the management subsystem 25 may measure the performance of the network with regard to the process or application being used. The management subsystem 25 then maps the traffic data, to the process information, the network information, and, optionally, the network performance in method element 63. The output of the mapping step 63 is used to create a profile in method element 65 and the profile is saved to the management database 47 in method element 67. The activity profile is a record in a database that includes (i) values identifying each process or application, and (ii) values of the bandwidth usage of the process or application based on the bandwidth measurements, for each network that the Device 10 was connected to when using the process or application.

Bandwidth Management Profile Subsystem. FIG. 5 illustrates the Bandwidth Management Profile Subsystem 27. The activity profiles created by the Management Subsystem 25 are categorized along a set of dimensions by a categorization component 71 of the Bandwidth Management Profile Subsystem 27. The categorization of the profiles may be based in part on expert knowledge. Dimensions of the categorization may include (a). Bandwidth consumption (high, medium, low);
(b). Initiation Mode (whether execution of the application or process is user-initiated or runs in background);
(c). Running Mode (whether the execution of the application or process takes place in real time or non-real-time, e.g. live streaming or buffered);
(d). Network Characteristics (described below); and
(e) Performance (described below).

A bandwidth management profile generator 73 is used to create a set of default bandwidth management profiles (BMPs). Each BMP represents a different level of bandwidth intensity (e.g. low, medium, high) The BMPs may then be presented to the user through user interface 75. Examples of default BMPs include (i) Allow all (ii) Moderate Bandwidth Conservation (iii) High Bandwidth conservation. Each BMP in turn will contain each of the identified processes and the user interface 75 may present a small number of choices (e.g. Allow. Limit, Block) to the user, and one choice filled in. The default may be based on expert knowledge, which the user can override to customize the profile. In the simplest embodiment the user may select a single profile per access network. For example, the user may select to allow all processes when on an unlimited use WiFi network and High Bandwidth Conservation when on a limited use network such as a 3G network. Embodiments of the invention allow for more complex cases. In an alternate embodiment, the user may be allowed to select a bandwidth budget and a time period, such that the application will be blocked after reaching its budget over that time period.

Illustrated in FIG. 6 is a process that may be implemented by the bandwidth management profile subsystem 27. The bandwidth management profile subsystem 27 receives activity profiles in method element 77. The activity profiles are then categorized in method element 79. A set of BMPs are created in method element 81. The process may then present the user with a set of default BMPs in method element 83. The process implemented by the bandwidth management profile subsystem 27 may then present the user with override options as illustrated in method element 85.

Network Mapping Subsystem. FIG. 7 is a flow diagram of a method that may be implemented by the network cost mapping subsystem 29. The network cost mapping subsystem 29 allows the user to specify the cost characteristics for a given network. The user selects a network (method element 91) and specifies whether the network is limited or unlimited usage (method element 93). If the network does not provide unlimited usage (e.g. usage based pricing), the user may then specify the network traffic profile (method element 95). The network traffic profile may, for example, identify cost, the low and peak rate times for the network or other parameters of cost. For any given network the user can then select multiple BMPs for certain time periods depending on the network traffic profile (method element 97). For example, a BMP may be more permissive with the bandwidth is abundant and more restrictive during peak times. Additionally, the user may associate a BMP based on network performance based on the performance measurements made by the network performance component 41 (method element 99).

Profile Coordination Subsystem. Profile Coordination Subsystem 31 (PCS) is used to associate a particular BMP with a particular network type, cost, and observed performance. Illustrated in FIG. 8 is an exemplary process that may be performed by the PCS 31. A BMP selected by the user is applied on a per-network basis. Once a given BMP has been selected for a particular network condition, the Management Subsystem 25 will police the network traffic for each application/process using the rules in the instantiated profile. The user initiates a process or application (method element 101) that requires network access. The PCS 31 intercepts or interrupts the application process and uses the application process name, process id and protocol information (method element 101). The PCS 31 then evaluates the new access request against the current loaded BPM (method element 107). If the network access is deemed to be allowed the PCS 31 would allow the application process to resume network access (method element 109). If the traffic would be deemed as unwanted, then the PC would block access to that application process by making the network unavailable for network access related system calls (method element 111).

Figure 9:
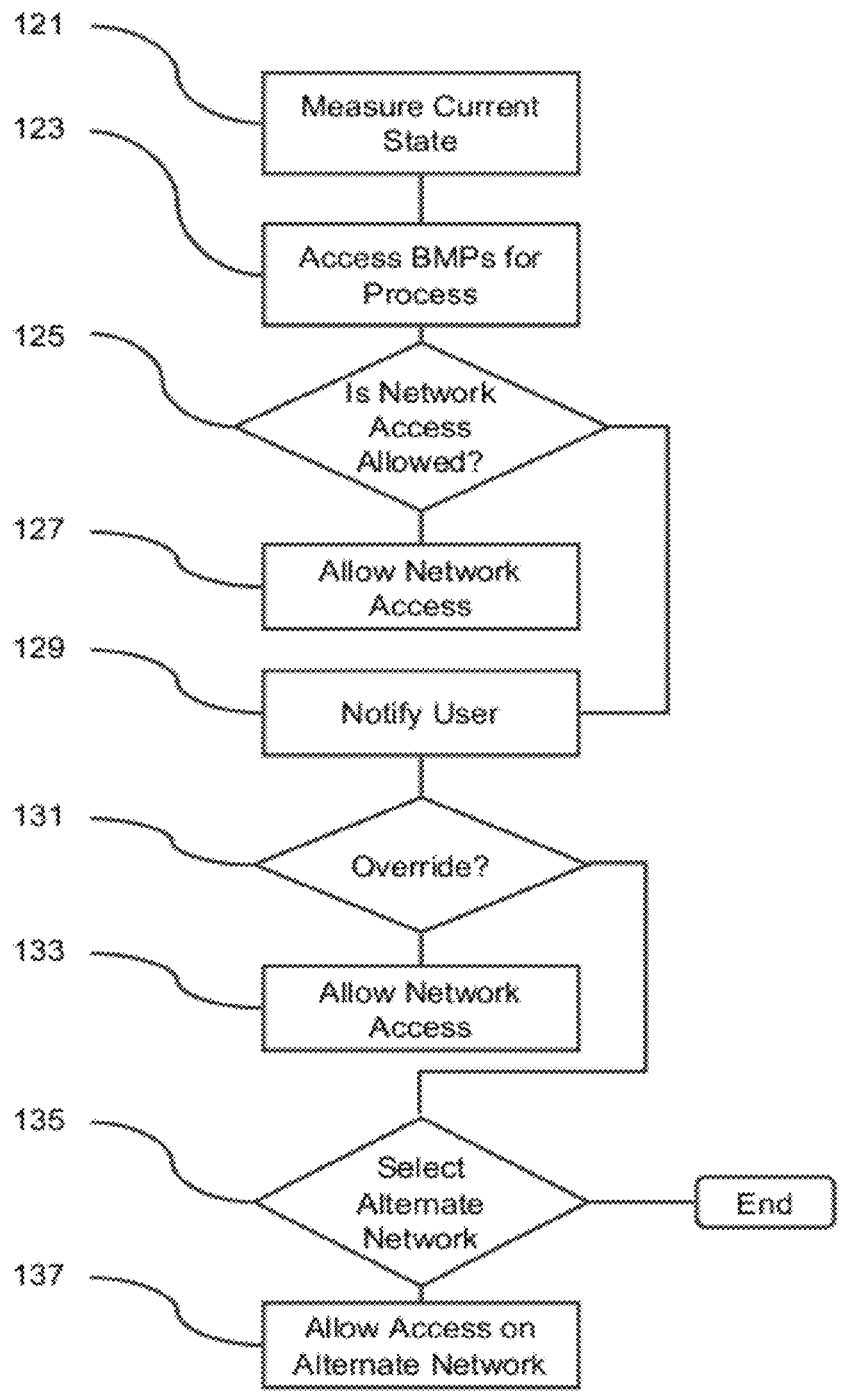
FIG. 9 illustrates an exemplary process implemented by an access control subsystem.

Application Access Control Subsystem. Additional flexibility in the determination of allowing access to the network (of method element 107) may be provided by incorporating an application access control subsystem 33. The method implemented by the application access control subsystem 33 is illustrated in FIG. 9. When the user initializes a process the application access control subsystem 33 measures the current state of the device. The current state of the Device 10 may include a measure of time, initiation mode, running mode and other characteristics that may have been used in the categorization performed in the bandwidth management profile subsystem 27. The default BMP 40 application is accessed (method element 123) and the system determines whether network access is allowed based on the current state of the Device 10 and the default BMP (method element 125). If the current state allows for network access the network access is provided (method element 127). If the current state does not allow for network access, then the user is notified (method element 129) and is provided with an option to override the default settings (method element 131). If the user overrides the default, the user will be allowed to access the network (method element 133). If the user elects not to override the default BMP the user may be provided with an option to select an alternate network (method element 135). If the user declines, access is not granted, if the user selects an alternate network then access is provided to the alternate network (method element 147).

The bandwidth management system 23 may be provided with an expert knowledge subsystem 35. The expert knowledge subsystem 35 is a rules based system where rules are used to represent heuristics, or "rules of thumb", which specify a set of actions to be performed for a given situation. The expert knowledge subsystem 23 may comprise a plurality of "if-then" rules based on the dimensions that an expert considers relevant. The "if" portion of a rule comprise a series of patterns which specify the data which cause the rule to be applicable. An inference engine, matches data against the patterns and determines which rules are applicable.

For example, a user may have access to three networks through a Device 10. Network N1 is not limited and can be accessed by the user at no cost (for example a network accessed at work). Network N2 limits the bandwidth that the user can consume (for example a network that provides access up to a certain limit for one price and charges another price when the limit is exceeded). Network N3 is a network that the user can access anywhere but charges based on the bandwidth consumed. The user has two applications in Device 10. Application A consumes little bandwidth, and the user desires to access the application anywhere (e.g. e-mail). Application B consumes a large amount of bandwidth, for example an application for downloading movies. The user employs the management subsystem 25 to measure the bandwidth consumed by the applications and the performance of the applications when connected to the network. The user then utilizes the bandwidth management profiles subsystem 27 to generate a set of BMPs. Based on the user's choice the BMPs may look as follows:

Application A on network N1—always allow
Application A on network N2—always allow
Application A on network N3—always allow
Application B on network N1—always allow
Application B on network N2—Limit
Application B on network N3—Block The application access control subsystem 33 selectively executes the process based on the BMP and the characteristics of the network to which the Device 10 is connected. In the foregoing example, if the user inadvertently tries to download a movie when connected to network N3, the bandwidth management system 23 would prevent the execution of the download application. The user may be provided with the ability to override the default BMP. As stated previously, the BMPs may include other characteristics such as application performance, network costs and the like. For example, a network may decide to adopt a two-tier subscription fee. A lower fee may be applied during off-peak hours and a higher fee applied during high peak hours. In such a case the characteristic based on peak hours may be included in the BMP.

Figure 10:
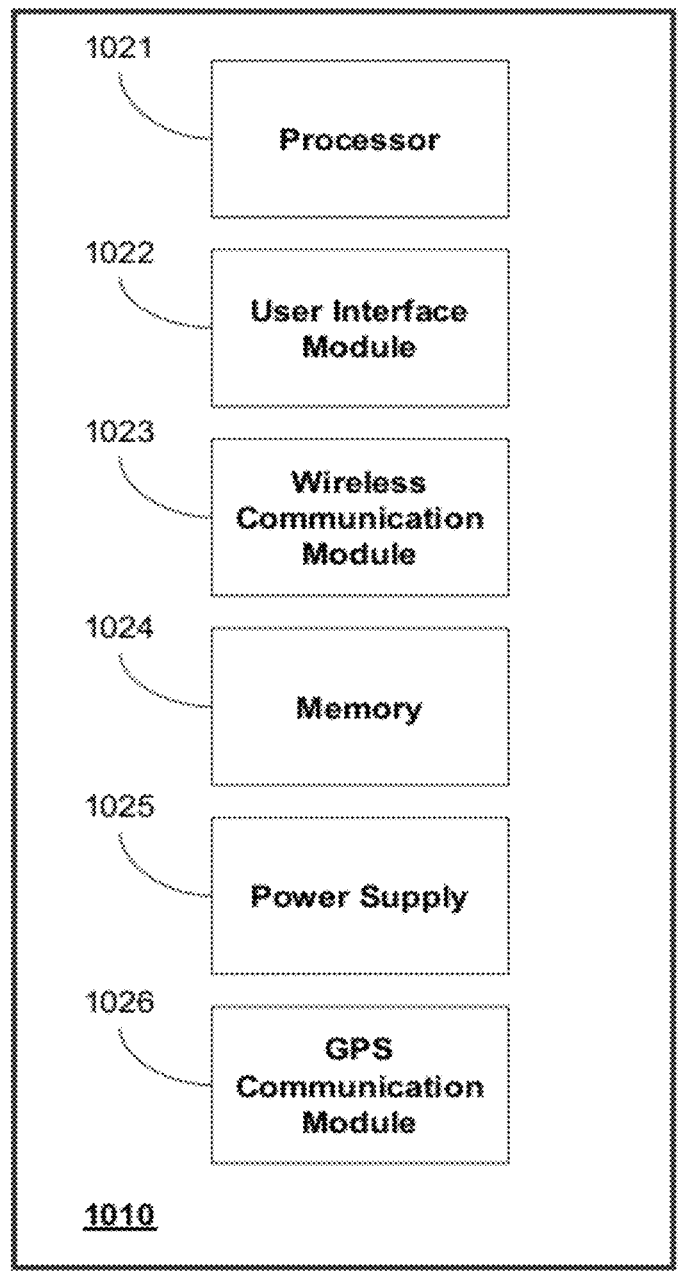
FIG. 10 is a block diagram of a non-limiting, exemplary wireless device that may be used in connection with an embodiment.

FIG. 10 illustrates an example wireless device 1010 that may be used in connection with an embodiment. References will also be made to other figures of the present disclosure as appropriate. It will be appreciated that the components and modules of wireless device 1010 illustrated in FIG. 10 are illustrative, and that any number and type of components and/or modules may be present in wireless device 1010. In addition, the functions performed by any or all of the components and modules illustrated in FIG. 10 may be performed by any number of physical components. Thus, it is possible that in some embodiments the functionality of more than one component and/or module illustrated in FIG. 10 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to constructing, transmitting, receiving messages such as SMS and MMS messages, operating an address book, and determining alternate addresses, for example. User interface module 1022 may be any type or combination of hardware and/or software that enables a user to operate and interact with wireless device 1010, in one embodiment, to compose and read messages. For example, user interface module 1022 may include a display, physical and "soft" keys, voice recognition and text to speech software or thin clients that connect to respective speech servers, microphone, speaker and the like. Wireless communication module 1023 may be any type or combination of hardware and/or software that enables wireless device 1010 to communicate with, for example, a cellular network or any other type of wireless communications network. Memory 1024 enables wireless device 1010 to store information, such as an address book, contacts information, or the like. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010.

GPS communication module 1026 may be any type or combination of hardware and/or software that enables wireless device 1010 to communicate with GPS location equipment. In one embodiment, wireless communication module 1023 may perform the functions of GPS communication module 1026. In an alternative embodiment, GPS communication module 1026 may be separate from wireless communication module 1023.

Figure 11:
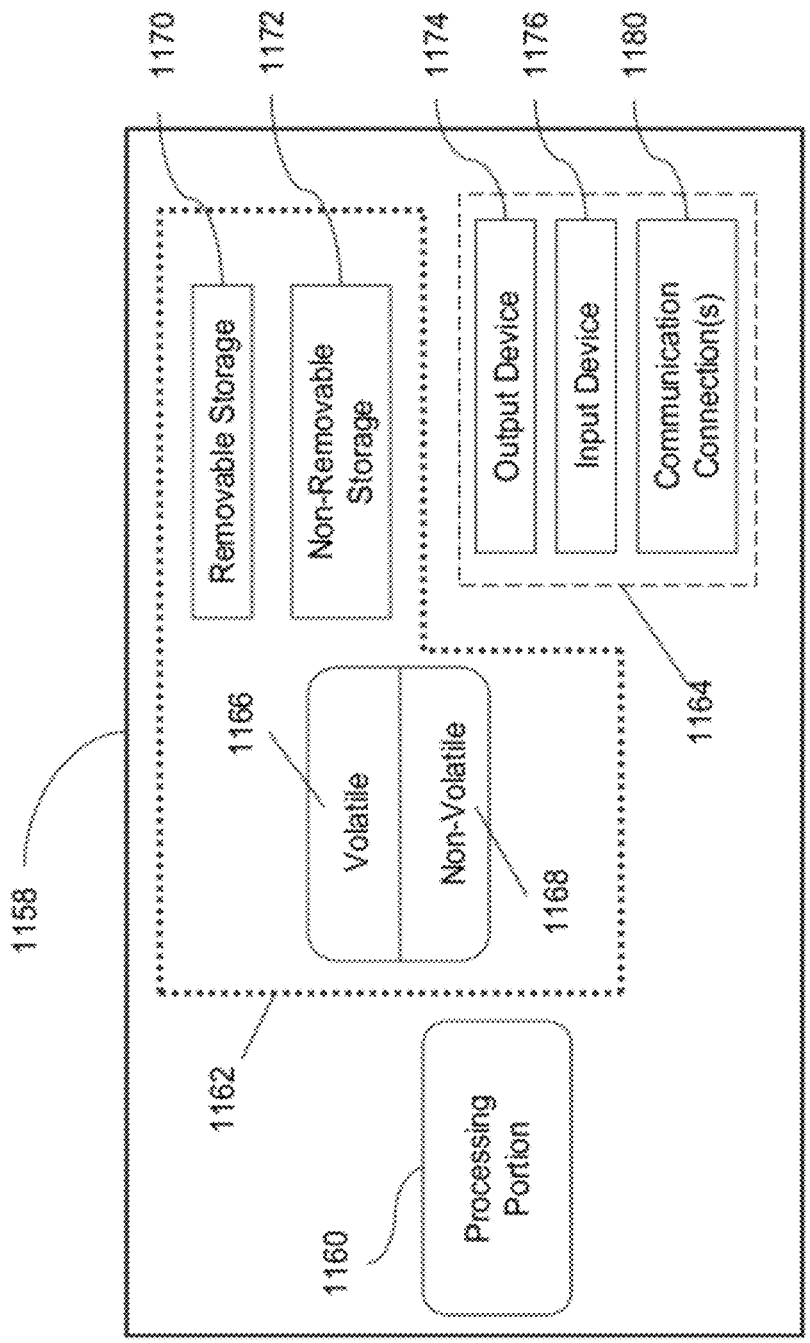
FIG. 11 is a block diagram of a non-limiting, exemplary processor in which the present subject matter may be implemented.

FIG. 11 is a block diagram of an example processor 1158 which may be employed in any of the embodiments described herein, including as one or more components of a communications device such as device 1010, which may be a wireless communications device, as one or more components of communications network equipment or related equipment, such as any component of a network, and/or as one or more components of any third party system or subsystems that may implement any portion of the subject matter described herein. It is emphasized that the block diagram depicted in FIG. 11 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof The processor 1158 comprises a processing portion 1160, a memory portion 1162, and an input/output portion 1164. The processing portion 560, memory portion 562, and input/output portion 1164 are coupled together (coupling not shown in FIG. 11) to allow communications between these portions. The input/output portion 1164 is capable of providing and/or receiving components utilized to, for example, transmit/receive messages and/or transmit/receive data for an address book or contact list.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing messages, contact information and numbers, determining alternate contacts, etc. For example, as described above, the memory portion is capable of storing an address book and software capable of operating the address book and determining alternate numbers. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network 103. Communications connection(s) 1180 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

Figure 12:
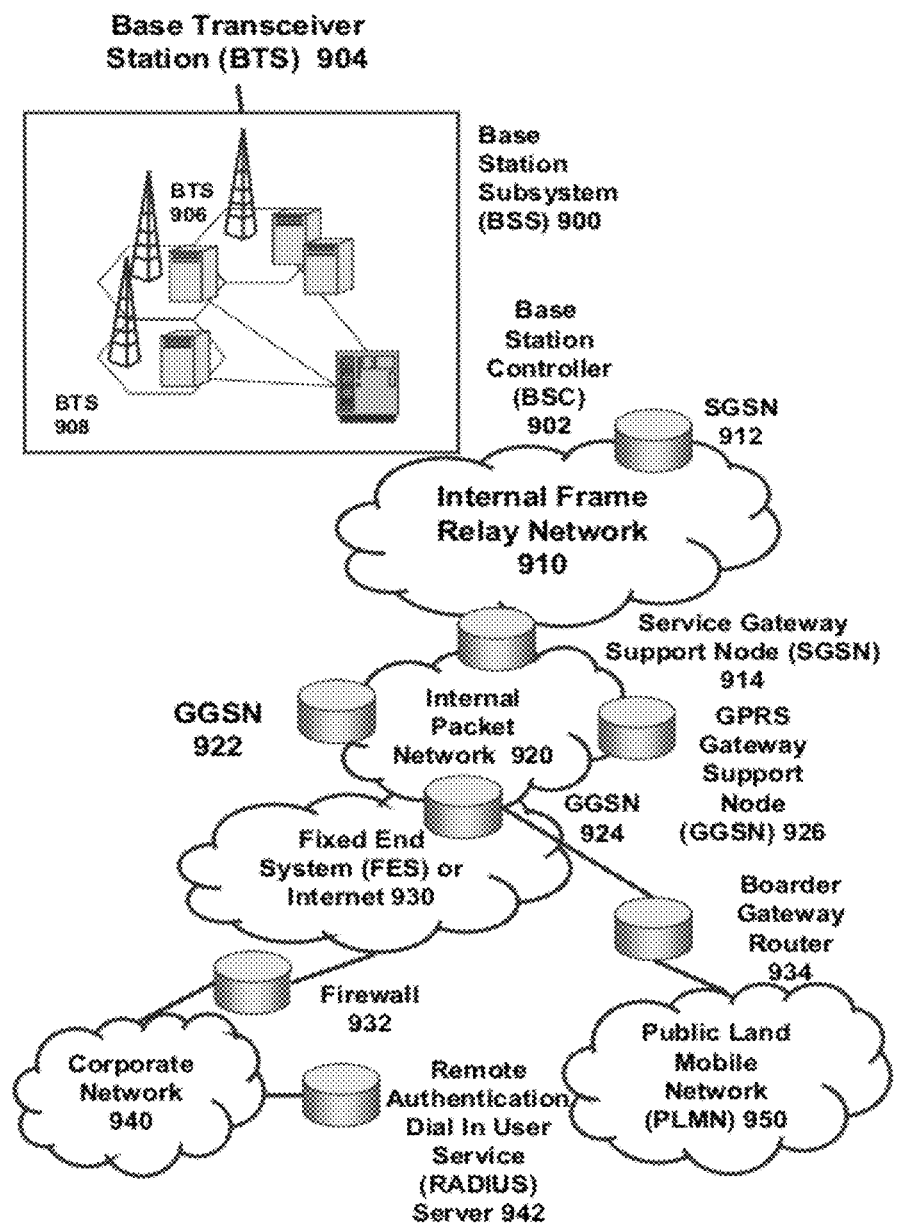
FIG. 12 is an overall block diagram of an exemplary packet-based mobile cellular network environment, such as a GPRS network, in which the present subject matter may be implemented.
Figure 13:
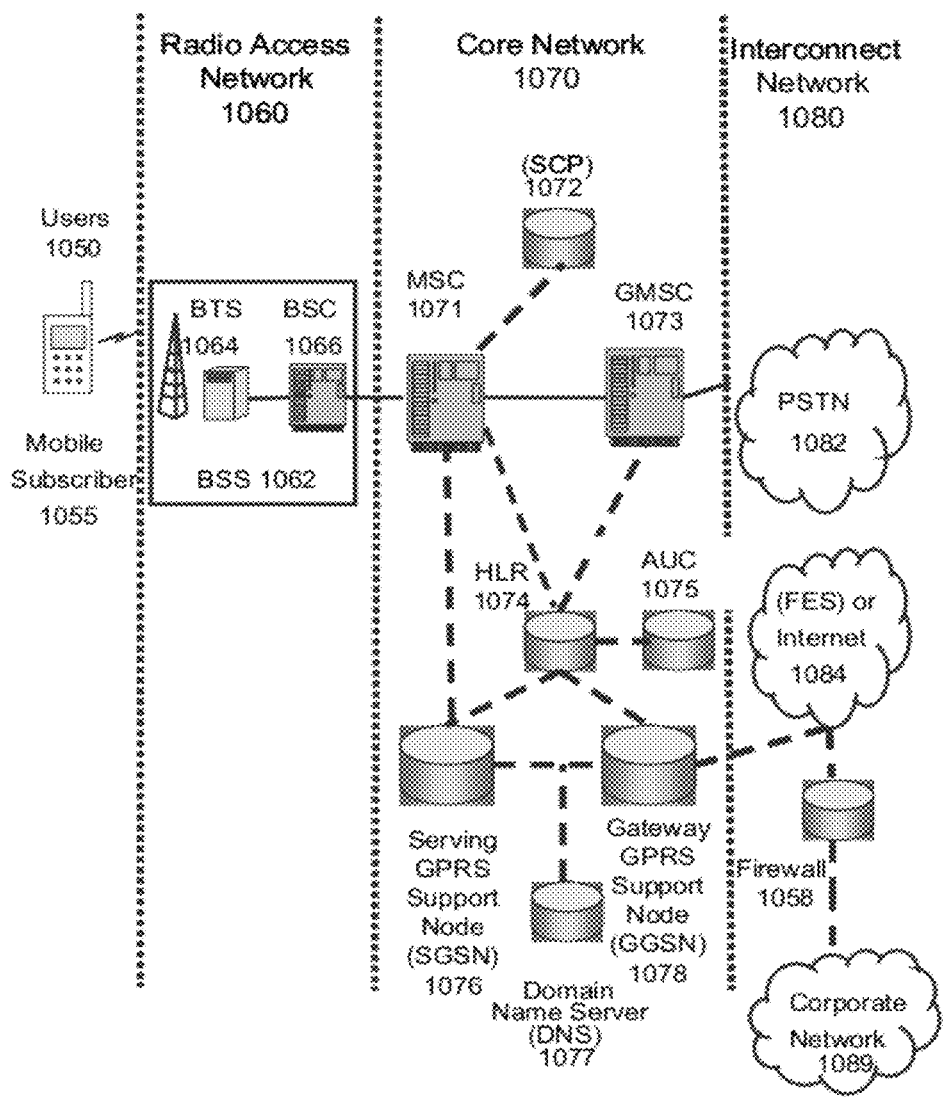
FIG. 13 illustrates a non-limiting, exemplary architecture of a typical GPRS network as segmented into four groups.
Figure 14:
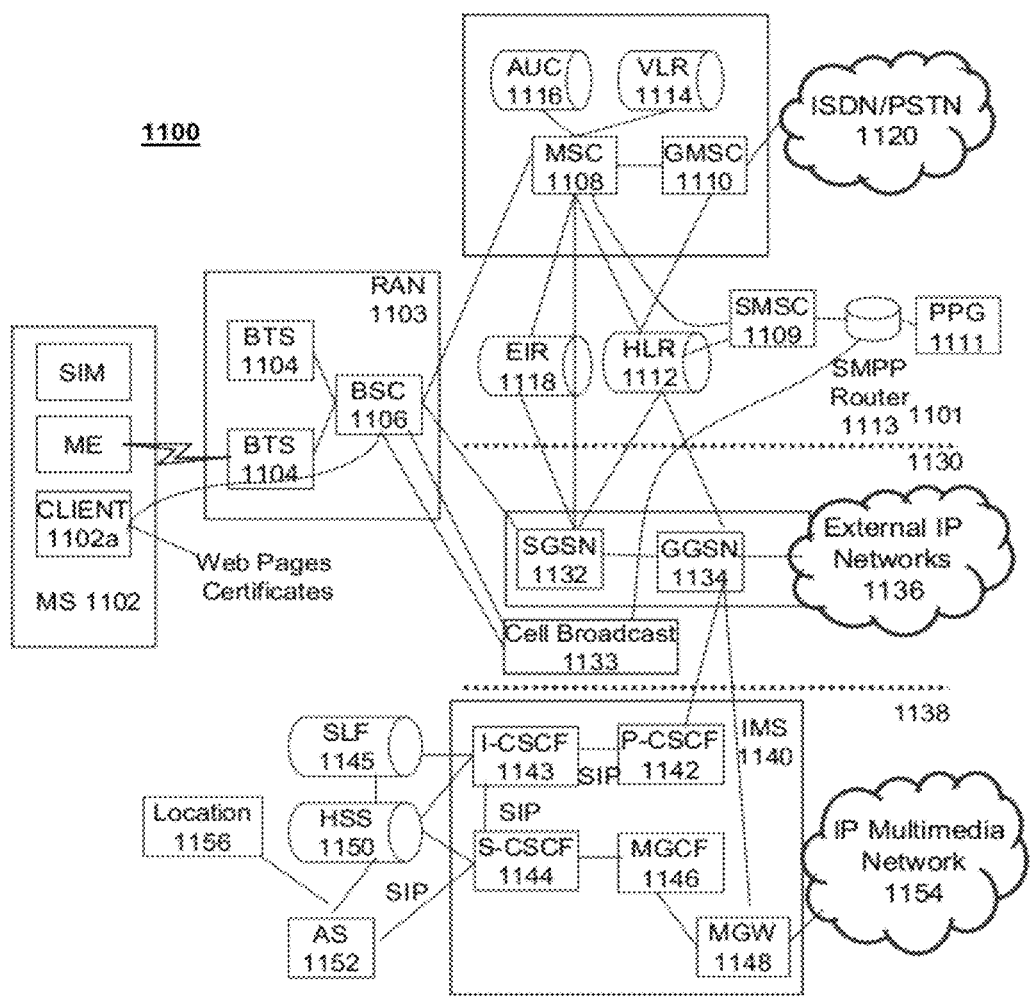
FIG. 14 illustrates a non-limiting alternate block diagram of an exemplary GSM/GPRS/IP multimedia network architecture in which the present subject matter may be implemented.

The device 1010 is connected to a network which may comprise any appropriate telephony radio network, or any other type of communications network, or any combination thereof (see for example the networks illustrated in FIGS. 12, 13 and 14. The following description sets forth some exemplary telephony radio networks, such as the global system for mobile communications (GSM), and non-limiting operating environments. The below-described operating environments should be considered non-exhaustive, however, and thus the below-described network architectures merely show how IP cellular broadcast may be used with stationary and non-stationary network structures and architectures. It can be appreciated, however, that systems for providing user names for network addresses such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the techniques of the utilization of SMS, MMS, and/or cellular broadcast can be applied independently of the method of data transport, and do not depend on any particular network architecture, or underlying protocols.

FIG. 12 depicts an overall block diagram of an exemplary packet-based mobile cellular network environment, such as a GPRS network, in which systems providing user names for network addresses such as those described herein can be practiced. In an example configuration, a cellular network may be encompassed by the network environment depicted in FIG. 12. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., Device 10) become connected to the wireless network. In exemplary fashion, the packet traffic originating from user devices (e.g., device 1010) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932; and PLMN 950 may be connected to GGSN 924 via boarder gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

FIG. 13 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 13). Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 13, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as device 1010, used by an end user of the mobile cellular service. When a mobile subscriber turns on his or her mobile device, the mobile device may go through an attach process by which the mobile device attaches to an SGSN of the GPRS network. In FIG. 13, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of message systems and methods for providing user names for network addresses such as those described herein can include but are not limited to Gateway GPRS Support Node tables, Fixed End System router tables, firewall systems, VPN tunnels, and any number of other network elements as required by the particular digital network.

FIG. 14 illustrates another exemplary block diagram view of a GSM/GPRS/IP multimedia network architecture 1100 in which systems providing user names for network addresses such as those described herein can be incorporated. As illustrated, architecture 1100 of FIG. 12 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., device 1010) that is used by mobile subscribers, with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. Such information may also include address book data and/or message forwarding preferences for each subscriber. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The VLR may also contain address book data and/or message forwarding preferences for each subscriber. The HLR 1112 and the VLR 1114, together with the MSC 1108, may provide the call routing and roaming capabilities of GSM, as well as message forwarding functionality. The AuC 1116 may provide the properties needed for authentication and encryption functions. Such properties allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a property in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM core network 1101, the GPRS network 1130 as well as the IP multimedia network 1138.

The IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

While example embodiments systems and methods providing user names for network addresses such as those described herein have been described in connection with various computing devices/processors, the underlying concepts can be applied to any computing device, processor, or system capable of implementing the systems and methods for providing user names for network addresses described. The various techniques described herein can be implemented in connection with hardware or software or, where appropriate, with a combination of both. Thus, the methods and apparatuses for the systems and methods for providing user names for network addresses, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for a system for providing user names for network addresses. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for providing user names for network addresses as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus a message forwarding system. When implemented on a general-purpose processor, the program code combines with the processor to provide a unique apparatus that operates to invoke the functionality of a message forwarding system. Additionally, any storage techniques used in connection with a message forwarding system can invariably be a combination of hardware and software.

While the systems and methods for providing user names for network addresses have been described in connection with the various embodiments of the various figures, it is to be understood that other similar embodiments can be used or modifications and additions can be made to the described embodiments for performing the same function message forwarding without deviating from the described systems and methods. For example, one skilled in the art will recognize that a system providing user names for network addresses as described in the present application may apply to any environment, whether wired or wireless, and may be applied to any number of such devices connected via a communications network and interacting across the network. Therefore, systems providing user names for network addresses such as those described herein should not be limited to any single embodiment, but rather should be construed in breadth and scope in accordance with the appended claims. These and other changes can be made to the invention in light of the above detailed description. In general, in the following claims, the terms used should not be construed to limit the invention to the specific embodiments disclosed in the specification and the claims, but should be construed to include all networked digital messaging systems that operate under the claims. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed:
1. A method comprising:
generating in a wireless device a bandwidth management profile for a process, the bandwidth management profile identifying a plurality of networks on which the process may execute, the bandwidth management profile identifying a set of rules to control what process will be executed, the rules being based on a measurement of the bandwidth used by the process when the wireless device is connected to each one of the plurality of networks, the costs associated with the bandwidth used in each one of the plurality of networks, and the performance of each one of the networks, and wherein each rule is further based on heuristics regarding the current network conditions and current situational conditions;
receiving a request to execute the process;
responsive to receiving the request:
  selecting, based on current network conditions, a selected network from the plurality of networks identified in the bandwidth management profile; and selecting, based on current situational conditions, a rule from the set of rules for the selected network identified in the bandwidth management profile; and executing the process on the selected network in accordance with the selected rule.

2. The method of claim 1, further comprising:

categorizing the process based on a plurality of dimensions including bandwidth used.

3. The method of claim 2, further comprising:

generating default profiles for the process connected to each network of the plurality of networks; and determining whether to allow the execution of the process on a network based on the default profiles.

4. The method of claim 3, further comprising providing an option to override a profile of the default profiles.

5. The method of claim 3, further comprising enabling specification of at least one characteristic of each network of the plurality of networks.

6. The method of claim 5, wherein the dimensions for the bandwidth management profile comprise at least one of initiation mode, running mode, performance, or network characteristics.

7. A system comprising:

a processor; and memory coupled to the processor, the memory comprising executable instructions that when executed by the processor cause the processor to effectuate operations comprising:

generating a bandwidth management profile for a process, the bandwidth management profile identifying a plurality of networks on which the process may execute, the bandwidth management profile identifying a set of rules to control what process will be executed, the rules being based on a measurement of the bandwidth used by the process when the wireless device is connected to each one of the plurality of networks, the costs associated with the bandwidth used in each one of the plurality of networks, and the performance of each one of the networks, and wherein each rule is further based on heuristics regarding the current network conditions and the current situational conditions;

receiving a request to execute the process;

responsive to receiving the request:

selecting, based on current network conditions, a selected network from the plurality of networks identified in the bandwidth management profile; and selecting, based on current situational conditions, a rule from the set of rules for the selected network identified in the bandwidth management profile; and executing the process on the selected network in accordance with the selected rule.

8. The system of claim 7, the operations further comprising:

categorizing the process based on a plurality of dimensions including bandwidth used.

9. The system of claim 8, the operations further comprising:

generating default profiles for the process connected to each network of the plurality of networks; and determining whether to allow the execution of the process on a network based on the default profiles.

10. The system of claim 9, the operations further comprising providing an option to override a profile of the default profiles.

11. The system of claim 9, further comprising specifying at least one characteristic of each network of the plurality of networks.

12. The system of claim 11, wherein the dimensions for the bandwidth management profile comprise at least one of initiation mode, running mode, performance, or network characteristics.

13. A computer readable storage medium that is not a propagating signal, the computer readable storage medium comprising executable instructions that when executed by a processor, cause the processor to effectuate operations comprising:

generating a bandwidth management profile for a process, the bandwidth management profile identifying a plurality of networks on which the process may execute, the bandwidth management profile identifying a set of rules to control what process will be executed, the rules being based on a measurement of the bandwidth used by the process when the wireless device is connected to each one of the plurality of networks, the costs associated with the bandwidth used in each one of the plurality of networks, and the performance of each one of the networks, and wherein each rule is further based on heuristics regarding the current network conditions and the current situational conditions;

receiving a request to execute the process;

responsive to receiving the request:

selecting, based on current network conditions, a selected network from the plurality of networks identified in the bandwidth management profile; and selecting, based on current situational conditions, a rule from the set of rules for the selected network identified in the bandwidth management profile; and executing the process on the selected network in accordance with the selected rule.

14. The computer readable storage medium of claim 13, the operations further comprising wherein the instructions to generate a bandwidth management profile comprises:

categorizing the process based on a plurality of dimensions including the bandwidth used.

15. The computer readable storage medium of claim 14, the operations further comprising:

generating default profiles for the process connected to each network of the plurality of networks; and determining whether to allow the execution of the process on a network based on the default profiles.

16. The computer readable storage medium of claim 15, the operations further comprising providing an option to override a profile of the default profiles.

17. The computer readable storage medium of claim 15, the operations further comprising enabling specification of at least one characteristic of each network of the plurality of networks.

18. The computer readable storage medium of claim 17, wherein the dimensions for the bandwidth management profile comprise at least one of initiation mode, running mode, performance, or network characteristics.

* * * * *